United States Patent [19]

Ueba et al.

[11] Patent Number: 4,564,263

[45] Date of Patent: Jan. 14, 1986

[54] PROCESS FOR PRODUCING PLASTIC OPTICAL FIBER

[75] Inventors: Yoshinobu Ueba; Shinichi Miyake, both of Osaka, Japan

[73] Assignee: Sumitomo Electric Industries, Ltd., Osaka, Japan

[21] Appl. No.: 608,085

[22] Filed: May 8, 1984

[30] Foreign Application Priority Data

Dec. 7, 1981 [JP] Japan ................. 56-197351

[51] Int. Cl.⁴ .................. B29C 71/04; G02B 6/00
[52] U.S. Cl. .................. 350/96.34; 264/1.4; 264/1.5; 264/22
[58] Field of Search ............ 264/1.4, 1.5, 22; 350/96.34

[56] References Cited

U.S. PATENT DOCUMENTS

| | | | |
|---|---|---|---|
| 3,930,103 | 12/1975 | Chimura | 264/1.5 |
| 3,993,834 | 11/1976 | Chimura | 264/1.5 |
| 4,311,726 | 1/1982 | Hacher | 264/1.5 |
| 4,455,267 | 6/1984 | Strahan | 264/1.4 |

FOREIGN PATENT DOCUMENTS

| | | | |
|---|---|---|---|
| 98578 | 1/1984 | European Pat. Off. | 264/1.5 |
| 2483310 | 12/1981 | France | 264/2.6 |
| 57-88406 | 6/1982 | Japan | 264/1.5 |
| 57-88405 | 6/1982 | Japan | 264/1.5 |
| 58-7602 | 1/1983 | Japan | 264/1.5 |
| 58-34404 | 2/1983 | Japan | 264/1.5 |
| 58-65402 | 4/1983 | Japan | 264/1.5 |
| 5898706 | 6/1983 | Japan | 264/1.5 |
| 1037498 | 7/1966 | United Kingdom | 264/1.5 |

*Primary Examiner*—James Lowe
*Attorney, Agent, or Firm*—Wenderoth, Lind & Ponack

[57] ABSTRACT

A process for producing a plastic optical fiber which consists of a core made of a homo- or co-polymer of alkyl methacrylate and a cladding made of a fluorine-containing polymer, which process comprising forming the cladding around the core and irradiating the optical fiber with an electron beam, the optical fiber produced by the process being used at a temperature higher than 80° C. without significant loss of light transmission.

11 Claims, No Drawings

PROCESS FOR PRODUCING PLASTIC OPTICAL FIBER

FIELD OF THE INVENTION

The present invention relates to a process for producing a plastic optical fiber. More particularly, it relates to a process for producing a plastic optical fiber which consists of a core made of a homo- or co-polymer of alkyl methacrylate and a cladding made of a fluorine-containing polymer.

BACKGROUND OF THE INVENTION

Usually, an optical fiber is made of silica glass or plastics. Among them, the silica glass-made optical fiber has good light transmission and practically widely used, for example, in the field of telecommunication. On the other hand, the plastic optical fiber has lower light transmission than the silica glass-made one, but it is light and has better flexibility and processability. By making use of these properties, it is proposed to use the plastic optical fiber in various fields, for example, in a field of short distance telecommunication or as a light guide or a sensor. Some of these applications require good heat resistance of the optical fiber. For example, the optical fiber to be used in optical data link of an automobile should resist a temperature as high as 100° to 120° C. generated from an engine housing. The conventional plastic optical fiber, however, cannot resist a temperature higher than 80° C. since it has a core made of polystyrene or polymethyl methacrylate. This is because such the conventional plastic fiber shrinks at a high temperature and its light transmission is deteriorated and further, at a temperature higher than 100° C., the fiber shrinks so greatly that not only the light transmission is deteriorated but also the fiber itself is broken, which means the complete failure of light transmission.

To prevent the shrinkage of the plastic optical fiber by heat in use, it may be preheat-treated. Although the preheat-treating can decrease the shrinkage of the fiber, it is made less flexible so that it tends to be more easily broken by vibration or bending. Therefore, the preheat-treating of the plastic optical fiber is not practically employed to prevent its shrinkage.

It is known that electron beam radiation improves thermal characteristics of some polymers such as polyvinyl chloride, polyethylene and an ethylene/vinyl acetate copolymer. Such polymers are roughly classified into two classes, namely a cross-linking type and a main chain cleavage type. The cross linking type includes polyvinyl chloride, the ethylene/vinyl acetate copolymer and polyvinylidene fluoride, and the main chain cleavage type includes polymethyl methacrylate. Therefore, it is expected that when the optical fibers comprising polymethyl methacrylate were subjected to electron radiation, the main chain of the polymer would be cleaved and the thermal and mechanical characteristics would be deteriorated.

It has now been found that certain specific polymers comprising alkyl methacrylate, however, behave as cross linking type polymers and the electron radiation will raises glass transition temperatures of the polymers to afford good materials for the plastic optical fiber.

SUMMARY OF THE INVENTION

Accordingly, the present invention provides a process for producing a plastic optical fiber which consists of a core made of a homo- or co-polymer of alkyl methacrylate and a cladding made of a fluorine-containing polymer, which process comprising forming the cladding around the core and irradiating the optical fiber with an electron beam.

DETAILED DESCRIPTION OF THE INVENTION

The core of the plastic optical fiber to be produced by the process of the invention is made of a homo-or co-polymer of alkyl methacrylate. Specific examples of the alkyl group of the methacrylate are $C_1$-$C_{10}$ alkyl groups such as methyl, ethyl, propyl, butyl, bornyl, isobornyl, adamantyl, etc. Specific comonomers copolymerizable with alkyl methacrylate are aryl methacrylate (eg. phenyl methacrylate, benzyl methacrylate, naphthyl methacrylate, etc.) and styrene derivatives (eg. p-phenylstyrene, p-tert-butylstyrene, p-cyanostyrene, p-iodostyrene, $\alpha$, $\beta,\beta$-trifluorostyrene, perfluorostyrene, 2,3,4,5,6-pentafluorostyrene, etc.). The homo- or co-polymer of alkyl methacrylate may contain a small amount, for example, 0.005 to 0.1 mole % of alkyl acrylate (eg. methyl acrylate, ethyl acrylate, etc.). Further, the polymer in which all or a part of hydrogen atoms are substituted with deuterium atoms may be used as the core material.

The cladding of the plastic optical fiber is made of a fluorine-containing polymer such as a copolymer of vinylidene fluoride and perfluoroolefin, a polymer comprising fluoroalkyl methacrylate, a copolymer comprising at least two kinds of fluoroalkyl methacrylates, and a blend of the homo- or co-polymer of fluoroalkyl methacrylate and the copolymer of vinylidene fluoride. Specific examples of the copolymer of vinylidene fluoride and perfluoroolefin are a copolymer of vinylidene fluoride with tetrafluoroethylene, trifluoroethylene or hexafluoropropylene and a terpolymer of vinylidene fluoride, trifluoroethylene and tetrafluoroethylene or of vinylidene fluoride, tetrafluoroethylene and hexafluoropropylene, etc. Specific examples of homo- or co-polymer of fluoroalkyl methacrylate are a polymer of 2,2,3,3-tetrafluoropropyl methacrylate, a polymer of 1H,1H,5H-octafluoropentyl methacrylate, a copolymer of 2,2,3,3-tetrafluoropropyl methacrylate and 1H,1H,5H-octafluoropentyl methacrylate, etc.

The spinning of the core material may be carried out according to a per se conventional method such as a screw-extrusion described in U.S. Pat. No. 3,993,834, the disclosure of which is hereby incorporated by reference, and Japanese Patent Publication No. 42261/1978. Further, extrusion by gas pressure or ram extrusion may be employed.

The cladding is formed around the core by either a solution method or a melting method in a per se conventional manner.

The electron radiation is carried out simultaneously with or after the spinning of the fiber. When the irradiation dose is too small, the thermal characteristics are not improved as much as intended. On the other hand, when it is too large, the mechanical properties tend to be deteriorated. The preferred electron dose is less than 15 Mrad, more preferably less than 10 Mrad.

According to the process of the invention, the plastic optical fiber having a diameter of 0.2 to 3 mm is easily produced. The optical fiber having a diameter of 0.5 to 1.0 mm is preferred due to its good flexibility and connectability with an illuminant. The thickness of the cladding is usually 5 to 20 micrometers and may be 20 micrometers or more, for example 100 to 500 micrometers and 1 mm.

The fluorine-containing polymer used as the cladding may contain a small amount of a cross-linking agent. The specific examples of the cross-linking agent are triallylisocyanurate, trimethylolpropane triallylate, etc.

The plastic optical fiber produced according to the process of the invention has low attenuation of light transmission and can be used at a temperature higher than 80° C. at which the conventional plastic optical fiber made of polymethyl methacrylate or polystyrene cannot be used. The plastic optical fiber of the invention shows less shrinkage at such high temperature and maintains good flexibility. The optical fiber of the invention has not only good thermal and mechanical characteristics but also light transmission as good as or better than that of the conventional plastic optical fiber.

The plastic optical fiber produced according to the present invention exhibits its excellent properties particularly in an atmosphere of high temperature or where a temperature is expected to be raised high.

PREFERRED EMBODIMENTS OF THE INVENTION

The present invention will be hereinafter explained in further detail by the following Examples, in which glass transition temperature, attenuation of light transmission, light transmission at a high temperature, tensile strength at break and elongation are measured and/or evaluated as follows:

Glass Transition Temperature

It is calculated from measurement of dynamic viscoelesticity.

Attenuation Of Light Transmission

The average attenuation of light transmission is calculated by measuring, with a plastic optical fiber having a length of 10 m, light intensity of incident and emitted light by means of a power meter and He-Ne laser as an illuminant at a room temperature by a cutting method. The attenuation L is calculated according to the following equation:

$$L = -(10/l) \log (I/I_0)$$

wherein $I_0$ is intensity of incident light, I is intensity of emitted light and l is the length of the sample fiber.

Light Transmission at a High Temperature

It is evaluated by the maximum temperature at which the intensity of the emitted light is reduced by 10% from that at room temperature. The maximum temperature is measured with a plastic optical fiber having a length of 5 m by immersing 3 m of the middle portion of the fiber in an oil bath and raising the bath temperature from room temperature to such maximum temperature.

Tensile Strength at Break and Elongation

These values are measured by means of Instron tensile tester with n=15.

EXAMPLE 1

0.99 Mole of methyl methacrylate purified by precision distillation and 0.01 mole of purified ethyl acrylate were charged in a glass-made polymerization reactor on a clean bench. 0.01 Mole % of N,N'-azobisisobutyronitrile which were recrystallized from ethanol twice as a polymerization initiator and 0.30 mole of n-butylmercaptan purified by distillation as a chain transfer agent were added and mixed. After the reactor atmosphere was thoroughly replaced with nitrogen gas, it was sealed with a plug made of polytetrafluoroethylene and heated at 90° C. for 14 hours, raised at a rate of 40° C./hr. and then kept at 130° C. for one hour. Thereafter, the polymer in the form of a rod was removed from the reactor by breaking the reactor carefully and kept in a polyethylene-made bag in order that glass powder or dust would not adhere to the polymer rod. From the thus formed polymer rod, a plastic fiber was melt spun by means of a rod-type spinning machine equipped with a plunger constant rate drive. The temperature of the melting chamber of the machine was 250° C. After cooling the melt spun fiber, a cladding of a vinylidene fluoride/tetrafluoroethylene copolymer with a molar ratio of 88/12 was formed by coating a 30% solution of the copolymer in methyl ethyl ketone and drying. The outer diameter of the thus formed optical fiber was 0.5 mm and the thickness of the cladding was 20 micrometers. Then, the optical fiber was irradiated with an electron beam at a predetermined dose and its properties were measured as described above. For comparison, properties of an optical fiber produced in the same manner but unirradiated were measured.

The results are shown in Table 1.

TABLE 1

| Dose (Mrad) | 0 | 5 | 10 | 15 |
|---|---|---|---|---|
| Tg (°C.) | 95 | 108 | 110 | 105 |
| Attenuation (dB/m) | 0.70 | 0.72 | 0.71 | 0.77 |
| Maximum temp. (°C.) | 80 | 91 | 95 | 90 |
| Tensile Strength at break (Kg/mm³) | 9.0 | 8.5 | 8.0 | 6.6 |
| Elongation (%) | 61 | 43 | 12 | 5 |

As is clear from the results shown in Table 1, Tg (glass transition temperature) of the irradiated optical fiber is raised in comparison with the unirradiated one. The irradiated optical fiber of the invention can be used at a temperature higher than 90° C. without significant loss of light transmission but the unirradiated one is not practically used at 80° C. The electron radiation does not adversely affect the tensile strength at break and attenuation at a room temperature while the elongation is slightly decreased at a high dose. From the above results, the preferred dose may be less than 15 Mrad.

EXAMPLE 2

In the same manner as in Example 1 but adding 5 parts by weight of triallylisocyanurate to 100 parts by weight of the vinylidene fluoride/tetrafluoroethylene copolymer, a plastic optical fiber was produced and was irradiated with an electron beam at a dose of 5 Mrad. The maximum temperature of the irradiated fiber was higher by 10° C. than unirradiated one.

EXAMPLE 3

0.69 Mole of methyl methacrylate purified by precision distillation, 0.30 mole of phenyl methacrylate distilled under a reduced pressure and 0.01 mole of purified ethyl acrylate were charged in a glass-made polymerization reactor on a clean bench. 0.01 Mole % of N,N'-azobisisobutyronitrile and 0.30 mole of n-butylmercaptan were added and mixed. After the reactor atmosphere was thoroughly replaced with nitrogen gas, it was sealed with a plug made of polytetrafluoroethylene and heated at 90° C. for 14 hours, raised at rate of 40°

C./hr. and then kept at 140° C. for two hours. Thereafter, a plastic optical fiber was produced in the same manner as in Example 1 and irradiated with an electron beam at a dose of 5 Mrad. Tg of the fiber was 112° C., and the maximum temperature of light transmission was 95° C.

EXAMPLE 4

0.68 Mole of methyl methacrylate purified by precision distillation, 0.30 mole of p-tert-butylstyrene distilled under a reduced pressure and 0.02 mole of purified ethyl acrylate were charged in a glass-made polymerization reactor on a clean bench. 0.01 Mole % of N,N'-azobisisobutyronitrile and 0.30 mole of n-butylmercaptan were added and mixed. After the reactor atmosphere was thoroughly replaced with nitrogen gas, it was sealed with a plug made of polytetrafluoroethylene and heated at 100° C. for 24 hours, raised at rate of 40° C./hr. and then kept at 140° C. for three hours. Thereafter, a plastic optical fiber was produced in the same manner as in Example 1 and was irradiated with an electron beam at a dose of 5 Mrad. Tg of the fiber was 114° C., and the maximum temperature of light transmission was 96° C.

EXAMPLE 5

0.60 Mole of methyl methacrylate purified by precision distillation, 0.39 mole of isobornyl methacrylate distilled under a reduced pressure and 0.01 mole of purified ethyl acrylate were charged in a glass-made polymerization reactor on a clean bench. 0.01 Mole % of N,N'-azobisisobutyronitrile and 0.30 mole of n-butylmercaptan were added and mixed. After the reactor atmosphere was thoroughly replaced with nitrogen gas, it was sealed with a plug made of polytetrafluoroethylene and heated at 90° C. for 14 hours, raised at rate of 40° C./hr. and then kept at 140° C. for three hours. Thereafter, a plastic optical fiber was produced in the same manner as in Example 1 and irradiated with an electron beam at a dose of 5 Mrad. Tg of the fiber was 116° C., and the maximum temperature of light transmission was 90° C.

EXAMPLE 6

In the same manner as in Example 1 but using, as a cladding, a copolymer of 2,2,3,3-tetrafluoropropyl methacrylate and 1H,1H,5H-octafluoropentyl methacrylate in a molar ratio of 1:1, a plastic optical fiber was produced and irradiated at a dose of 5 Mrad. Tg of the irradiated optical fiber was 105° C., and the maximum temperature of light transmission was 90° C.

EXAMPLE 7

In the same manner as in Example 1 but using, as a cladding, a blend of a polymer of 2,2,3,3-tetrafluoropropyl methacrylate and polyvinylidene fluoride in a weight ratio of 1:1, a plastic optical fiber was produced and irradiated at a dose of 5 Mrad. Tg of the irradiated optical fiber was 107° C., and the maximum temperature of light transmission was 91° C.

What is claimed is:

1. A process for producing a plastic optical fiber which consists of a core made of a homo- or co-polymer of alkyl methacrylate and a cladding made of a fluorine-containing polymer, which process comprises forming the cladding around the core and irradiating the optical fiber with an electron beam.

2. The process according to claim 1, wherein a core is made of a homopolymer of alkyl methacrylate.

3. The process according to claim 1, wherein the core is made of a copolymer of alkyl methacrylate with at least one comonomer selected from the group consisting of phenyl methacrylate, benzyl methacrylate, naphthyl methacrylate, p-phenylstyrene, p-tert-butylstyrene, p-cyanostyrene, p-iodostyrene, $\alpha,\beta,\beta$-trifluorostyrene, perfluorostyrene and 2,3,4 5,6-pentafluorostyrene.

4. The process according to claim 1, wherein alkyl methacrylate is one selected from the group consisting of methyl methacrylate, ethyl methacrylate, propyl methacrylate, butyl methacrylate, bornyl methacrylate, isobornyl methacrylate and adamantyl methacrylate.

5. The process according to claim 4, wherein alkyl methacrylate is methyl methacrylate.

6. The process according to claim 1, wherein the fluorine-containing polymer is a copolymer of vinylidene fluoride.

7. The according to claim 6, wherein the fluorine-containing polymer is one selected form the group consisting of a vinylidene fluoride/tetrafluoroethylene copolymer, a vinylidene fluoride/trifluoroethylene copolymer, a vinylidene fluoride/hexafluoropropylene copolymer, a vinylidene fluoride/trifluoroethylene/tetrafluoroethylene terpolymer and a vinylidene fluoride/tetrafluoroethylene/hexafluoropropylene terpolymer.

8. The process according to claim 1, wherein the fluorine-containing polymer is a homo- or co-polymer of fluoroalkyl methacrylate.

9. The process according to claim 1, wherein the fluorine-containing polymer is a blend of the copolymer of vinylidene fluoride and the homo- or co-polymer of fluoroalkyl methacrylate.

10. The process according to claim 1, wherein electron dose is less than 15 Mrad, preferably less than 10 Mrad.

11. The plastic optical fiber which is produced by a process according to claim 1.

* * * * *